United States Patent [19]
Hagiwara et al.

[11] Patent Number: 5,784,035
[45] Date of Patent: Jul. 21, 1998

[54] LARGE SCREEN DISPLAY APPARATUS USING A PLURALITY OF DISPLAY SCREENS

[75] Inventors: Toshiyuki Hagiwara; Atsushi Tanaka; Manami Ozono; Masatoshi Kameyama, all of Tokyo, Japan

[73] Assignee: Mitsubishi Denki Kabushiki Kaisha, Tokyo, Japan

[21] Appl. No.: 734,405

[22] Filed: Oct. 16, 1996

[30] Foreign Application Priority Data

Jan. 29, 1996 [JP] Japan ................... 8-013068

[51] Int. Cl.$^6$ ........................... G09G 5/00
[52] U.S. Cl. ................... 345/3; 345/903; 345/1
[58] Field of Search ............... 345/1, 2, 3, 903; 348/206

[56] References Cited

U.S. PATENT DOCUMENTS

| | | | |
|---|---|---|---|
| 4,800,376 | 1/1989 | Suga et al. | 345/1 |
| 5,361,078 | 11/1994 | Caine | 345/1 |
| 5,523,769 | 6/1996 | Laver et al. | 345/903 |
| 5,530,457 | 6/1996 | Helgeson | 345/1 |

FOREIGN PATENT DOCUMENTS 3-201080  9/1991  Japan.

OTHER PUBLICATIONS

The Panoramix Extension, Madeline T. Asmus, pp. 59–73.
Courtyard: Integrating Shared Overview on a Large Screen and Per-user Detail on Individual Screens, Masayuki Tani et al., CHI94–4/94, pp. 44–50.

*Primary Examiner*—Richard A. Hjerpe
*Assistant Examiner*—Ricardo Osorio

[57] ABSTRACT

A large screen display apparatus comprises a plurality of displays constituting a single large screen for displaying an object. The object is formed on the basis of screen data which is generated by a screen data generating section. Each of the displays is provided with a local data generating section for converting a coordinate of the screen data from the screen data generating section into a coordinate of a local coordinate system peculiar to the individual displays. Because the local data generating sections, each provided to one respective display, executes coordinate conversion to the screen data, it is possible to reduce load to the screen data generating section, and to thereby provide a display performance with a rapid response.

19 Claims, 9 Drawing Sheets

LARGE SCREEN DISPLAY APPARATUS USING A PLURALITY OF DISPLAY SCREENS

BACKGROUND OF THE INVENTION

1. Field of the Invention

The present invention relates to a large screen display apparatus capable of generating a single screen by utilizing a plurality of displays.

2. Description of the Prior Art

There is a great demand for large, high-resolution screens. However, a conventional high-resolution display suffers from a size limitation due to the structure and manufacturing process of a single display. A large screen display apparatus of multiscreen type can overcome the limitation on screen size while maintaining a high resolution. Japanese Patent Application Laid-open No. 3-201080 discloses, for instance, a large screen display apparatus of the type comprising a plurality of projection type displays arranged in a matrix.

The disclosed large screen display apparatus comprises a common picture data processing circuit for transmitting picture data to the image generating circuits for the respective displays. The respective image generating circuits generate graphic data after processing such as shadowing, shading, and surface elimination. The generated graphic data is temporarily stored in a frame buffer and then converted into an analog signal by a D/A converter. The signal is finally supplied to the respective displays.

The common picture data processing circuit of the above conventional large screen display apparatus concentratedly converts the coordinates of picture data regarding a graphic to be displayed on the local screens of the respective displays. As a result, the load or processing amount of the picture data processing circuit increases remarkably as more displays are provided, thereby resulting in a deterioration of display performance such as display speed. Moreover, the picture data is successively supplied from the picture data processing circuit to a plurality of displays in a set order. The performance of a whole screen is therefore degraded when changing screen images as more displays are provided. Furthermore, such a large screen display apparatus suffers from a deterioration in video image since the synchronization between the respective local screens cannot be maintained due to differences in the period spent for transmission of data and for processing data.

Japanese Patent Publication Kokoku No. 2-61759 discloses another type of a large screen display apparatus. The apparatus comprises a controller for transmitting picture data for a single large screen in parallel to the respective displays. The respective displays window the picture data for their own individual local screens. The apparatus can improve the performance since the controller distributes in parallel the same picture data to the respective displays.

SUMMARY OF THE INVENTION

The present invention accordingly aims to provide a large screen display apparatus capable of displaying a single large screen image without deteriorating the display performance, even when additional displays are displayed.

According to the first aspect of the present invention, there is provided a large screen display apparatus comprising: a plurality of displays capable of generating a single screen for displaying an object; a screen data generating section capable of generating screen data for forming the object; a plurality of local data generating sections connected to respective displays for converting, prior to any graphic processing, a coordinate of the screen data from the screen data generating section into a coordinate of a local coordinate system peculiar to the respective displays.

With the above arrangement, the local data generating sections are provided for the individual displays for converting the coordinates of screen data. It is therefore possible to reduce the load to the screen data generating section and thereby provide a display performance with a rapid response.

The screen data generating section may include a local data selecting circuit capable of selecting from the screen data local screen data for corresponding local screens peculiar to the respective displays, and a data output circuit for sending the selected local screen data in a predetermined order to a corresponding local data generating section.

In this arrangement, if the data output circuit is provided with a switching circuit for switching the predetermined order in accordance with the content of the object, it is possible to establish a human friendly display in response to the content by changing the order of data transmission. For instance, the successive transmission of the local screen data to the displays in a horizontal direction enables easy reading of horizontal text, transmission in a vertical direction enables easy reading of a vertical text, and transmission of the local screen data to the displays in a diagonal direction enables easy recognition of a diagonal image. The transmission of the local screen data to the displays in a helical direction enables easy recognition of a still picture such as a human or a scenery image.

The screen data generating section may further include a stamping circuit capable of stamping a time stamp onto the selected local screen data, while the local data generating section may include a stamp determining circuit for determining a moment specified by the time stamp, and a screen image generating circuit for causing the respective displays to display on the basis of corresponding local screen data at the moment specified.

The arrangement allows the displays on the respective local screens to synchronize or desynchronize with one another on the basis of the time stamp. For example, a video image can thus be displayed without any deficiencies.

In addition, the local data generating section may include a local data selecting circuit capable of selecting from the screen data local screen data for a corresponding local screen peculiar to the respective display. The screen data generating section may output the screen data in multicast. The arrangement can reduce load to the screen data generating section, thereby increasing data transmission speed.

More local data generating sections may be provided than the number of the displays. In this case, it is preferable to switchably connect the local data generating sections to the displays via a switching circuit. The arrangement enables the connection of a local data generating section for back-up via the switching circuit when any local data generating section becomes inoperative.

The screen data generating section may further include a processing capacity measuring circuit for measuring processing capacity of the local data generating sections and a data amount changing circuit for changing the volume of screen data on the basis of the measured processing capacity. When a video signal is to be processed, for instance, the period spent for processing the individual local data generating section can fall into an interval between frames. As a result, a favorable video display can be provided.

According to the second aspect of the present invention, there is provided a large screen display apparatus comprising a plurality of displays capable of generating a single screen for displaying an object; a screen data generating section capable of generating screen data for forming the object; a plurality of local data selecting circuits connected to respective displays for selecting from the screen data local screen data for a corresponding local screen peculiar to the respective display; a plurality of coordinate conversion circuits capable of converting a coordinate of the selected local screen data into a coordinate of a local coordinate system peculiar to the respective display; and a screen image generating circuit capable of causing the respective displays to display by using the local screen data converted in the coordinate conversion circuit.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and the other objects, features and advantages will be more apparent from the following description of the preferred embodiment taken in conjunction with the accompanying drawings which are given by way of illustration only, and thus are not limitative of the present invention, and wherein.

DESCRIPTION OF THE PREFERRED EMBODIMENTS

Figure 1:
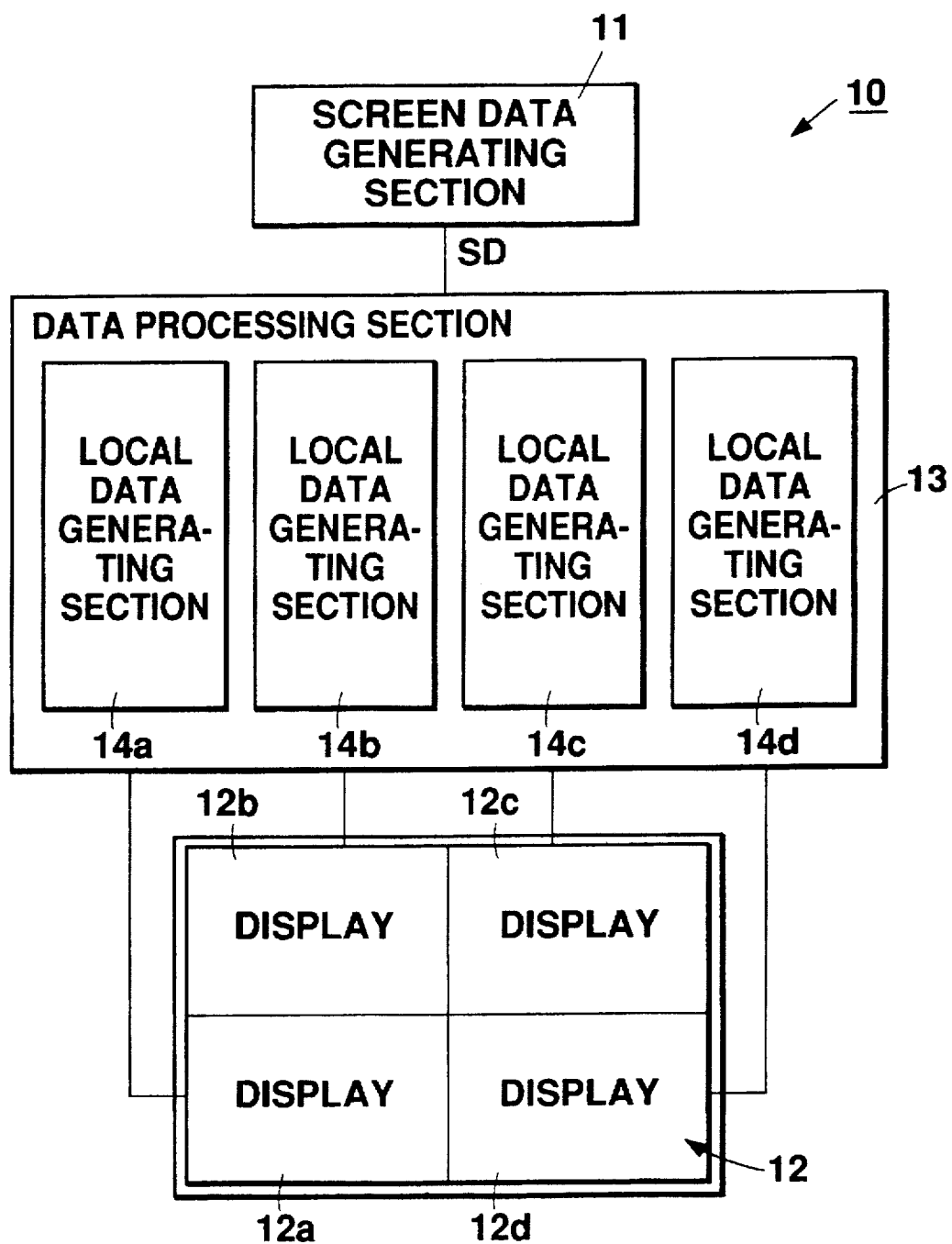
FIG. 1 shows an entire structure of a large screen display apparatus according to a first embodiment of the present invention.

FIG. 1 illustrates an entire structure of a large screen display apparatus 10 according to a first embodiment of the present invention. The large screen display apparatus 10 comprises a screen data generating section 11 capable of generating screen data SD for forming a desired screen image. Local screens 12a to 12d defined by the displays in cooperation generate a single screen 12 for displaying the screen image on the basis of the screen data SD. A data processing section 13 processes the screen data SD and transmits the data to the respective displays. The data processing section 13 comprises a plurality of local data generating sections 14a to 14b, each connected to one of the respective displays for generating local data of a partial screen image to be displayed on the corresponding local screen 12a to 12d on the basis of the screen data SD. The screen data SD may include drawing data for drawing lines and graphics on the screen 12, still picture data for displaying still pictures on the screen 12, and video data for displaying motion pictures on the screen 12.

Figure 2:
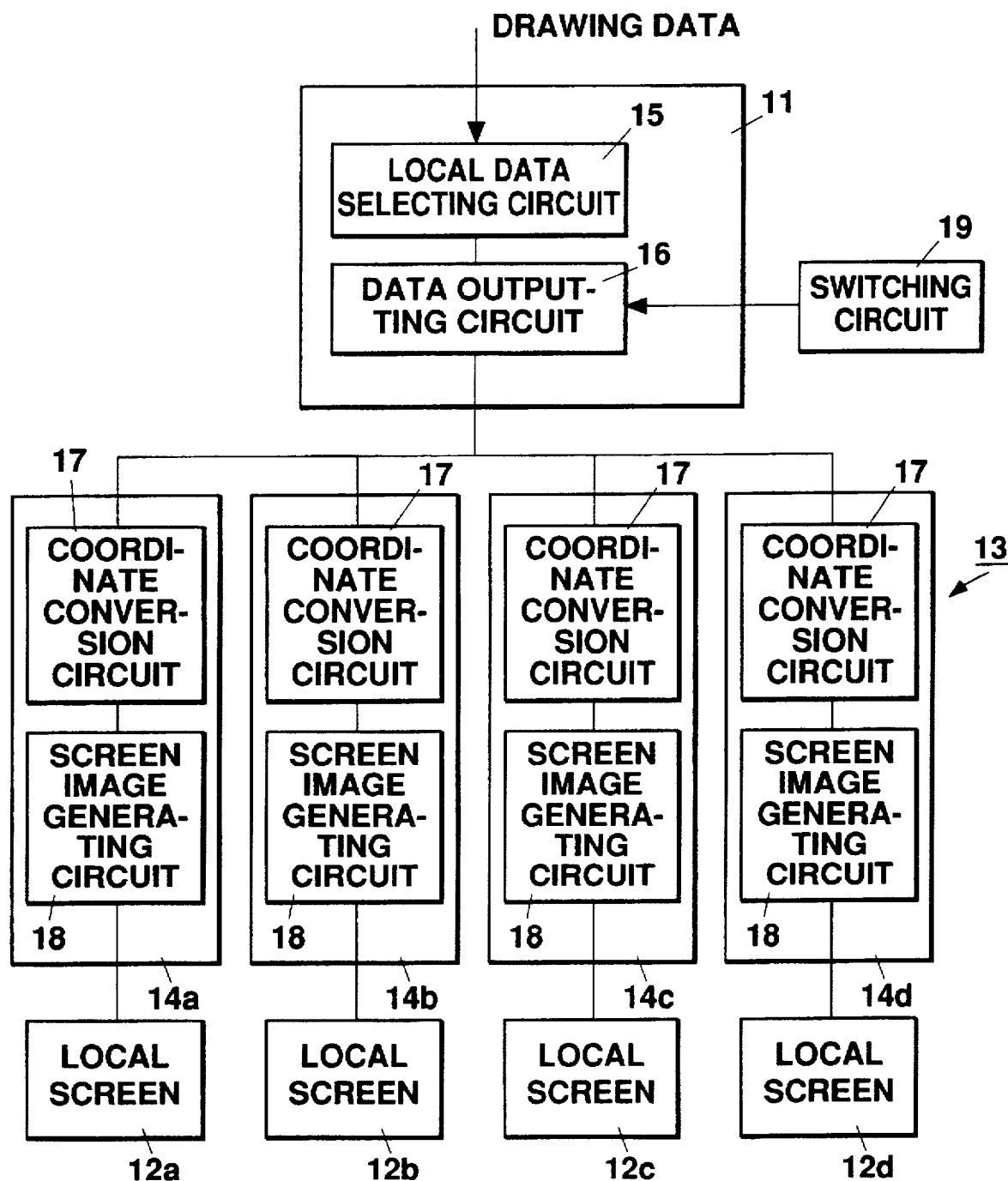
FIG. 2 is a block diagram illustrating a screen data generating section and local data generating sections.

The screen data generating section 11 comprises, as shown in FIG. 2, a local data selecting circuit 15 for selecting local screen data for a corresponding local screen 12a to 12d from the screen data SD. The section 11 further comprises a data outputting circuit 16 for sending out the selected local screen data to the corresponding local data generating sections 14a to 14d in a predetermined order. The local screen data of an overall coordinate system from the data outputting circuit 16 is converted, by a coordinate conversion circuit 17 of the individual local data generating circuits 14a to 14d, into data of a local coordinate system peculiar to the individual displays. A screen image generating circuit 18 causes the corresponding display to display by using the local screen data of the local coordinate system.

Figure 3:
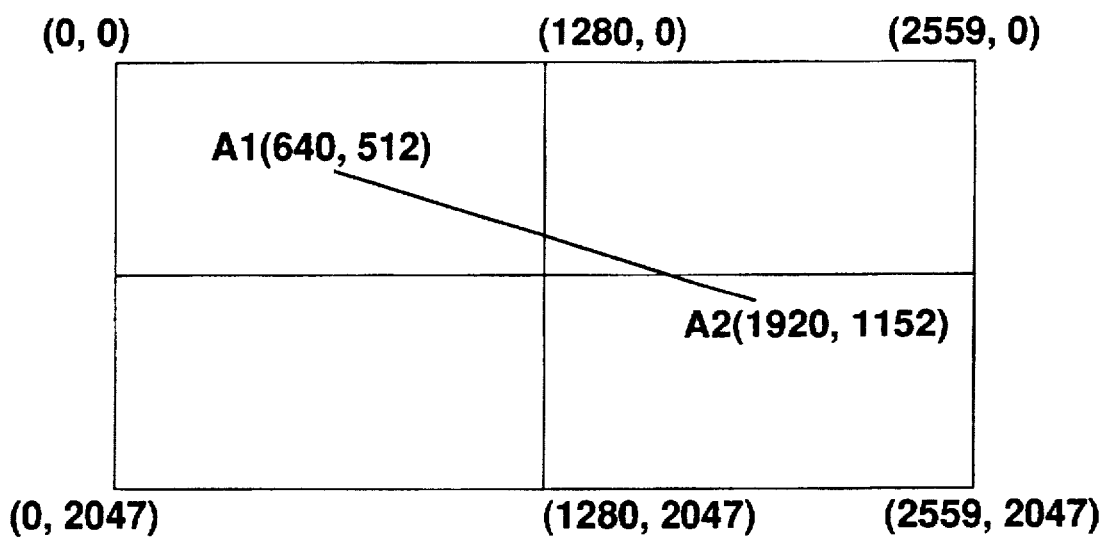
FIG. 3 shows an overall coordinate system including a line segment to be drawn on a large screen.

FIG. 3 illustrates four 1280 by 1024 pixel displays arranged in a 2 by 2 matrix, assuming that a line segment is drawn from A1(640, 512) to A2(1920, 1152) in this overall coordinate system on the screen 12. The origin (0, 0) of this overall coordinate system is set at the up left corner of the screen 12.

The local data selecting circuit 15 of the screen data generating section 11 selects local screen data for the individual local screens 12a to 12d from drawing data as the screen data. The selection may be made on the basis of the positions of the local screens 12a to 12b in the overall coordinate system. The selected local screen data are transmitted from the data outputting circuit 16 to corresponding displays which are linked to any of the selected local screens. A display not related to the screen data does not receive the local screen data. The selection of displays which should receive the local screen data is accomplished by the provision of a changeover switch in the data transmission path, or the attachment of an identifier or header to a data group. In the present case, no data is transmitted to the display for the bottom left local screen 12a, since the line segment does not pass through the local screen 12a.

The coordinate conversion circuit 17 of the respective local data generating sections 14a to 14d converts the supplied local screen data in the form of the overall coordinate system into a coordinate of a local coordinate system peculiar to the respective displays. No coordinate conversion takes place for the local screen 12b since the origin of the screen 12b is set at the origin of the overall coordinate system. The local coordinate A1(640, 512) and A2(1920, 1152) can be obtained for the local screen 12b. The local screen 12c has the origin of the local coordinate system at the point (1280, 0) of the overall coordinate system, so that the local coordinate A1(−640, 512) and A2(640, 1152) can be obtained for the local screen 12c after the coordinate conversion. Likewise, the local coordinate A1(−640, −512) and A2(640, 128) can be obtained for the local screen 12d. To summarize, a local coordinate (localX, localY) can be obtained from the following expressions:

$$(localX)=(allX)-(offsetX)$$

$$(localY)=(allY)-(offsetY) \qquad (1)$$

wherein (allX) is an x coordinate in the overall coordinate system, (allY) is a y coordinate in the same, (offsetX) is an x coordinate of the origin of the local coordinate system in the overall coordinate system, and (offsetY) is a y coordinate of the origin of the local coordinate system in the overall coordinate system.

The individual screen image generating circuits 18 generate pixel data for the corresponding displays using the local screen data with the converted coordinates. The pixel data includes information such as luminance, brightness, and chromaticity of pixels on the individual local screens 12a to 12d. The pixel data serves to display partial line segments on the individual local screens 12b to 12d, so that a continuous line segment A1(640, 512)–A2(1920, 1152) is resultantly displayed on the single large screen 12.

Figure 4:
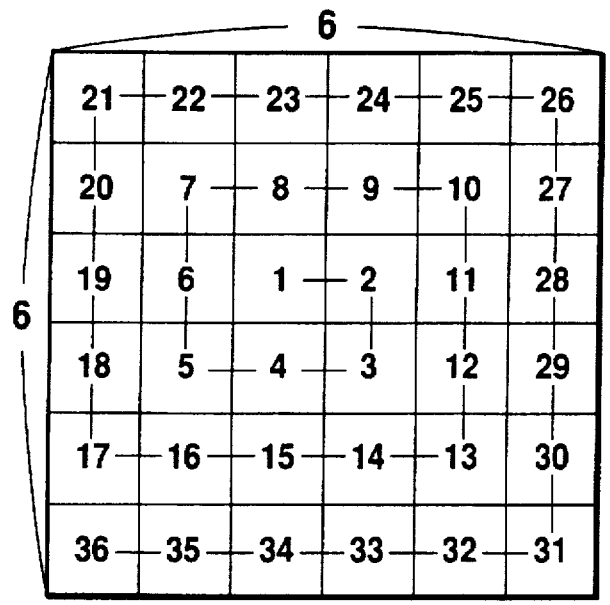
FIG. 4 shows a spiral displaying order of displays.

In the first embodiment, a switching circuit 19 is connected to the data outputting circuit 16, as shown in FIG. 2, for changing the order of transmitting local screen data to the local data generating sections 14a to 14d in response to the content of the object to be displayed. Assume that a single screen 12 is generated by displays arranged in a 6×6 matrix and is controlled using the screen data generating section 11 and data processing section 13 according to the first embodiment. When a still picture including a person or scenery is displayed on the screen 12, the command from the switching circuit 19 causes the data outputting circuit 16 to transmit local screen data to the displays in a helical direction, beginning with the central display towards outer displays as shown in FIG. 4. As a result, the still picture appears to be spreading from the center to the periphery in the screen 12 in the order specified in FIG. 4. When people watch an image, a tendency to first look at the center of the image and then move his eyes toward peripheral areas thereof. The display order of the local screens can thus accomplish a realistic display.

Figure 5:
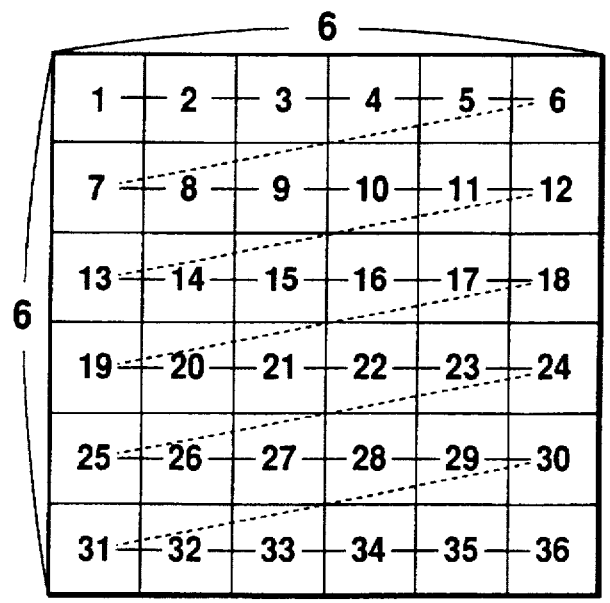
FIG. 5 shows a horizontal displaying order of displays.
Figure 6:
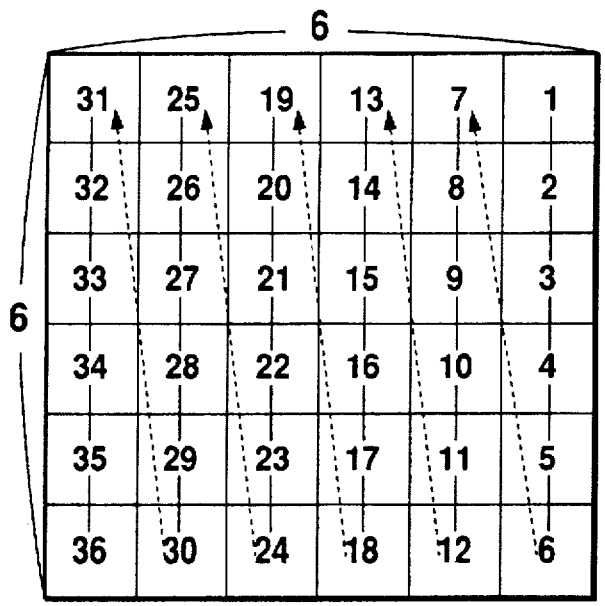
FIG. 6 shows a vertical displaying order of displays.
Figure 7:
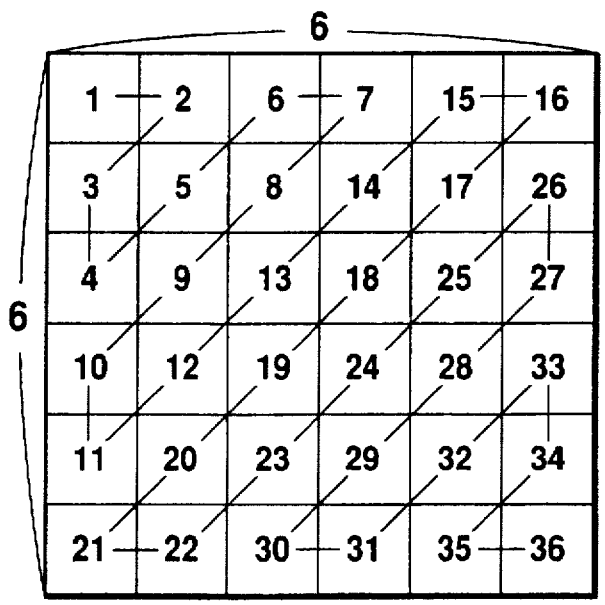
FIG. 7 shows a diagonal displaying order of displays.

When laterally arranged text, such as an English text, is to be displayed on the screen 12, local screen data may be successively transmitted to the displays in a horizontal direction as shown in FIG. 5. Data transmission in this order enables a human friendly display since humans read this text in a lateral direction. When a vertically arranged text is to be displayed, local screen data may be successively transmitted to the displays arranged in a vertical direction as shown in FIG. 6, thereby realizing a human friendly display. When a diagonally arranged image is displayed, local screen data may likewise be successively transmitted to the displays arranged in a diagonal direction as shown in FIG. 7.

It should be noted that the transmission order of the local screen data may be fixed depending on the application of the screen 12 in place of changing the order by a switching circuit 19.

Figure 8:
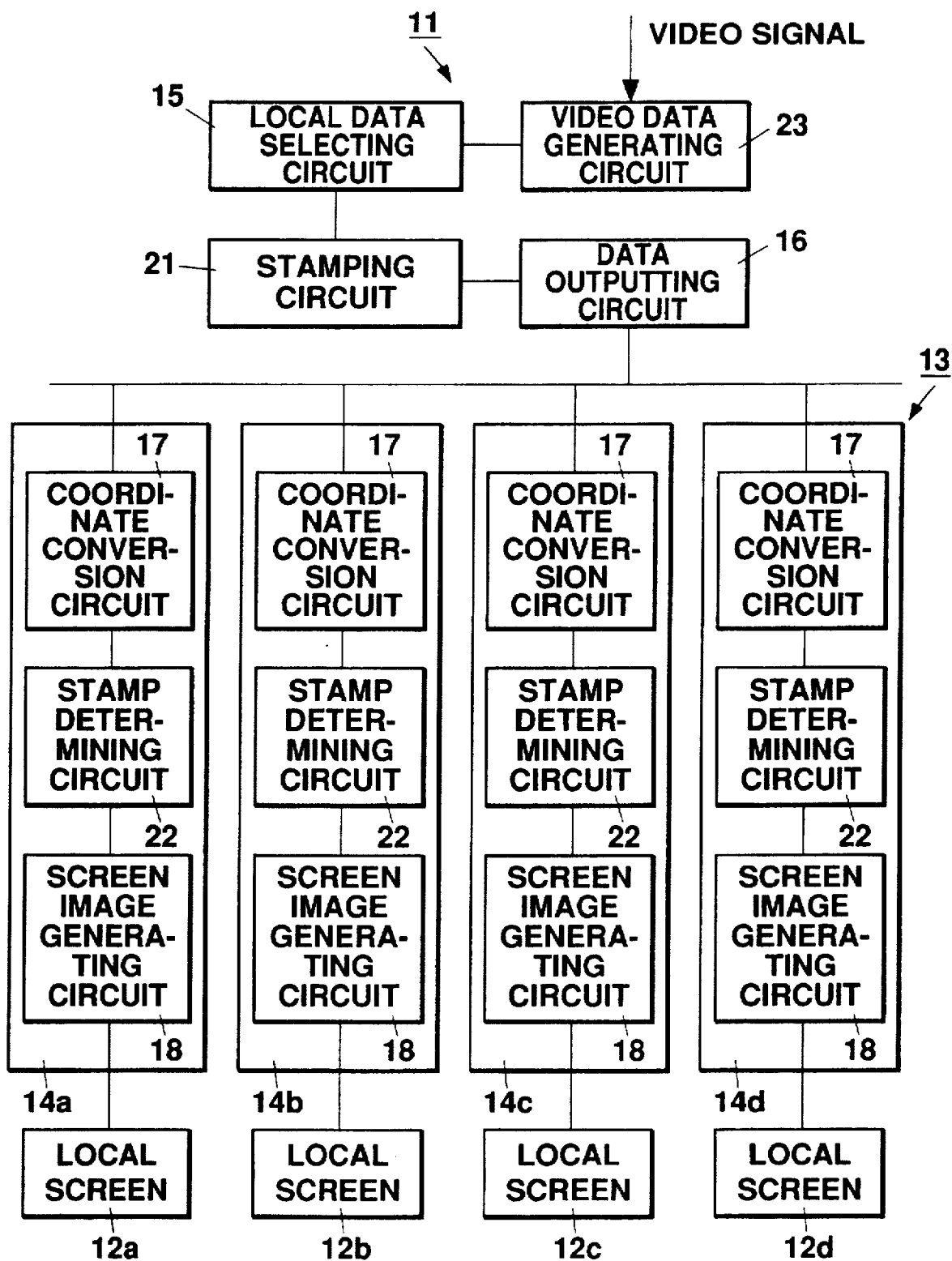
FIG. 8 shows an entire structure of a large screen display apparatus according to a second embodiment of the present invention.

FIG. 8 illustrates a structure of a large screen display apparatus according to a second embodiment of the present invention. In this embodiment, the screen data generating section 11 includes a stamping circuit 21 for stamping a time stamp on local screen data selected by the local data selecting circuit 15. Such a time stamp enables the synchronization or desynchronization of display timing for the individual local screens. Any element for the same function as in the foregoing first embodiment is identified by the same reference numerals, so that the detailed explanation thereof is omitted.

When the screen data generating section 11 of the second embodiment receives an analog video signal, the video data generating circuit 23 converts the supplied video signal into digital video data. The local data selecting circuit 15 selects local video data as local screen data for the individual displays from the converted video data. The stamping circuit 21 stamps the local screen data with a predetermined time stamp for every frame. The data outputting circuit 16 transmits the stamped local screen data to the individual local data generating sections 14a to 14d.

The screen image generating circuit 18 of the individual local data generating sections 14a to 14d begins processing display of the image at the moment specified by the time stamp. If the specified moment has already passed, the stamp determining circuit 22 destroys the local screen data. For this reason, it is preferable that a period for processing data at the individual local data generating sections 14a to 14d be adjusted to be shorter than the interval between frames. A plurality of local screens 12a to 12d thus simultaneously display an image on the identical frame.

Figure 9:
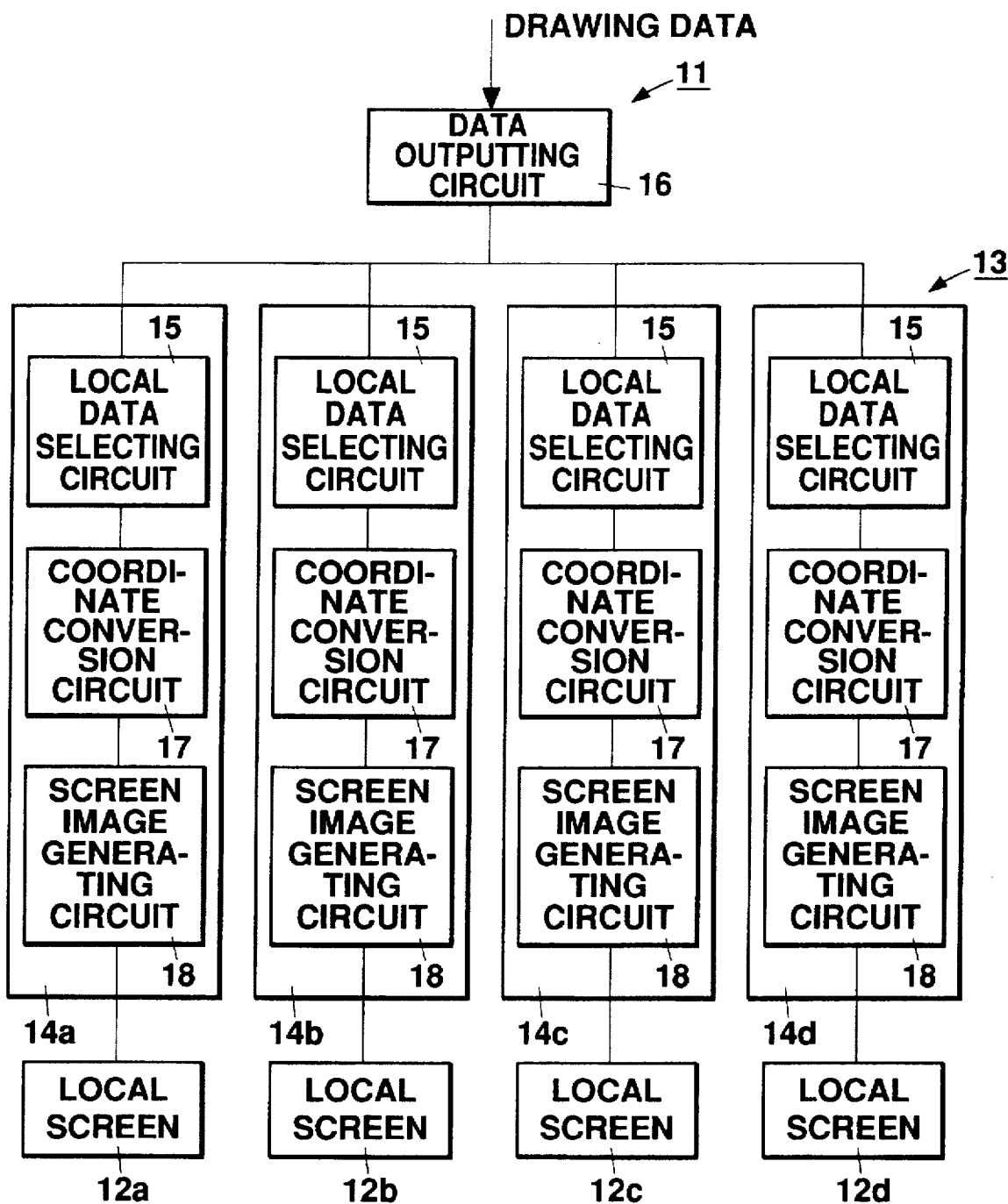
FIG. 9 shows an entire structure of a large screen display apparatus according to a third embodiment of the present invention.

FIG. 9 illustrates a structure of a large screen display apparatus according to a third embodiment of the present invention. In this third embodiment, the individual local data generating sections 14a to 14d include a local data selecting circuit 15. The data outputting circuit 16 of the screen data generating section 11 can transmit screen data in multicast, so that a transmission period can be reduced, thereby resulting in an enhanced response. The local data generating sections 14a to 14d, which do not need local screen data, allow the local data selecting circuit 15 to destroy the supplied screen data. The elements with the identical function as in the foregoing first and second embodiments are identified by the same reference numerals and are explained above in detail.

Figure 10:
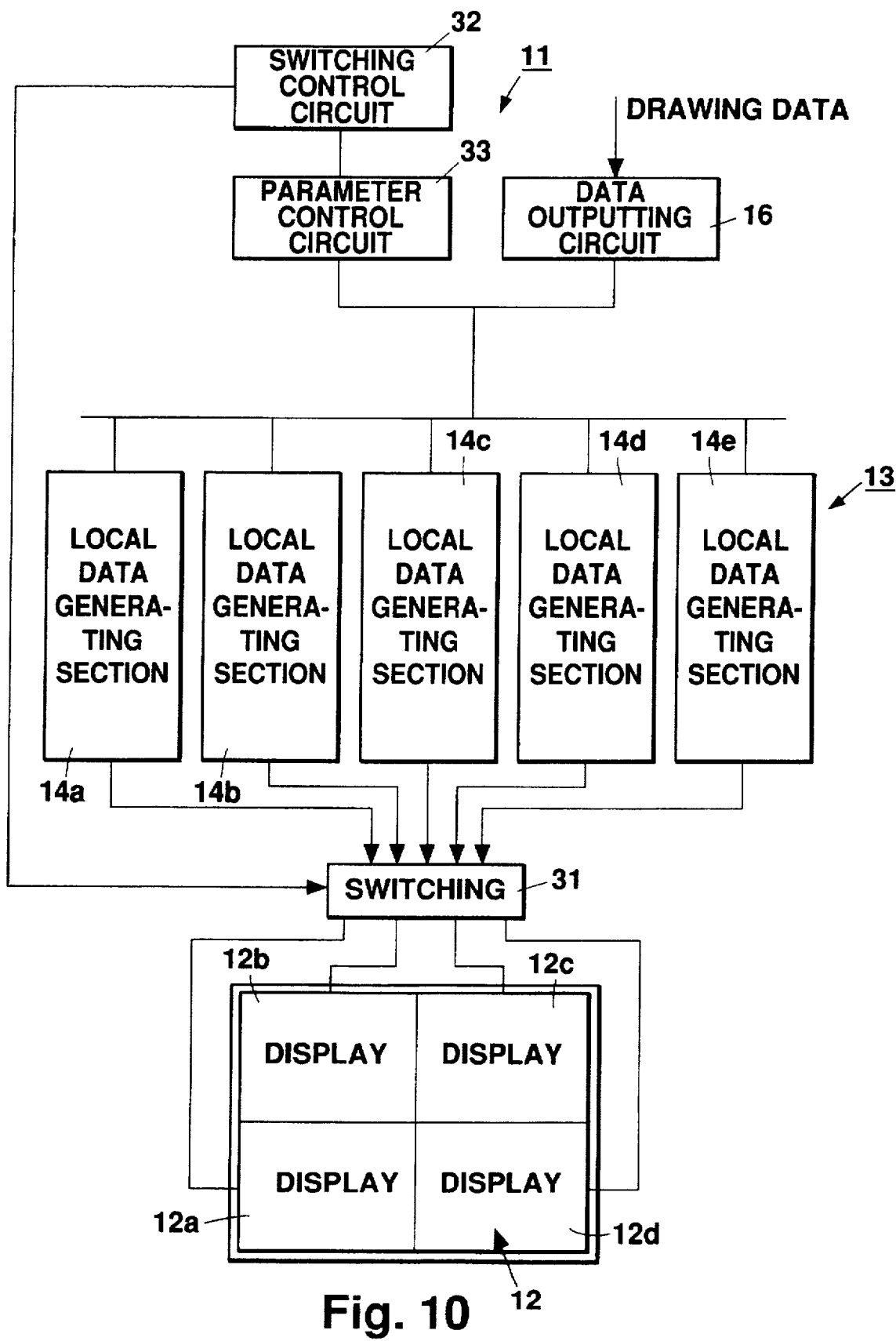
FIG. 10 shows an entire structure of a large screen display apparatus according to a fourth embodiment of the present invention.

FIG. 10 illustrates a structure of a large screen display apparatus according to a fourth embodiment of the present invention. In this fourth embodiment, more local data generating sections 14a to 14e are provided than the number of displays constituting the individual local screens 12a to 12d. The individual local data generating sections 14a to 14e are switchably connected to the displays via a switching circuit 31. A redundant local data generating section can replace any local data generating section which becomes inoperative. The elements with the identical functions as in the foregoing first to third embodiments are identified with the same reference numerals and are explained above in detail.

The data outputting circuit 16 of the fourth embodiment normally sends out screen data to the first to fourth local data generating sections 14a to 14d in multicast. The individual local data generating sections 14a to 14d select local screen data. The selected local screen data is subjected to coordinate conversion, as described above, and then supplied to the corresponding display via the switching circuit 31.

Assume that the fourth local data generating section 14d becomes inoperative so that an image on the local screen 12d accidentally disappears. The switching control circuit 32 in the screen data generating section 11 detects the discontinuity of the image display and dispatches a switching command to the switching circuit 31. The switching command causes the switching circuit 31 to accordingly disconnect data transmission between the inoperative fourth local data generating section 14d and the display for the local screen 12d, and then establish data transmission between the fifth local data generating section 14e and the display. At the same time, the switching control circuit 32 supplies a switching command to a parameter control circuit 33. The switching command causes the parameter control circuit 33 to change the parameters of the coordinate conversion circuit of the fifth local data generating section 14e in correspondence to the local screen 12d. Parameters may be (offsetX) and (offsetY) in the expression (1). The fifth local data generating section 14e displays an image on the local screen 12d in place of the fourth local data generating section 14d. The image can be maintained on the whole screen 12.

Figure 11:
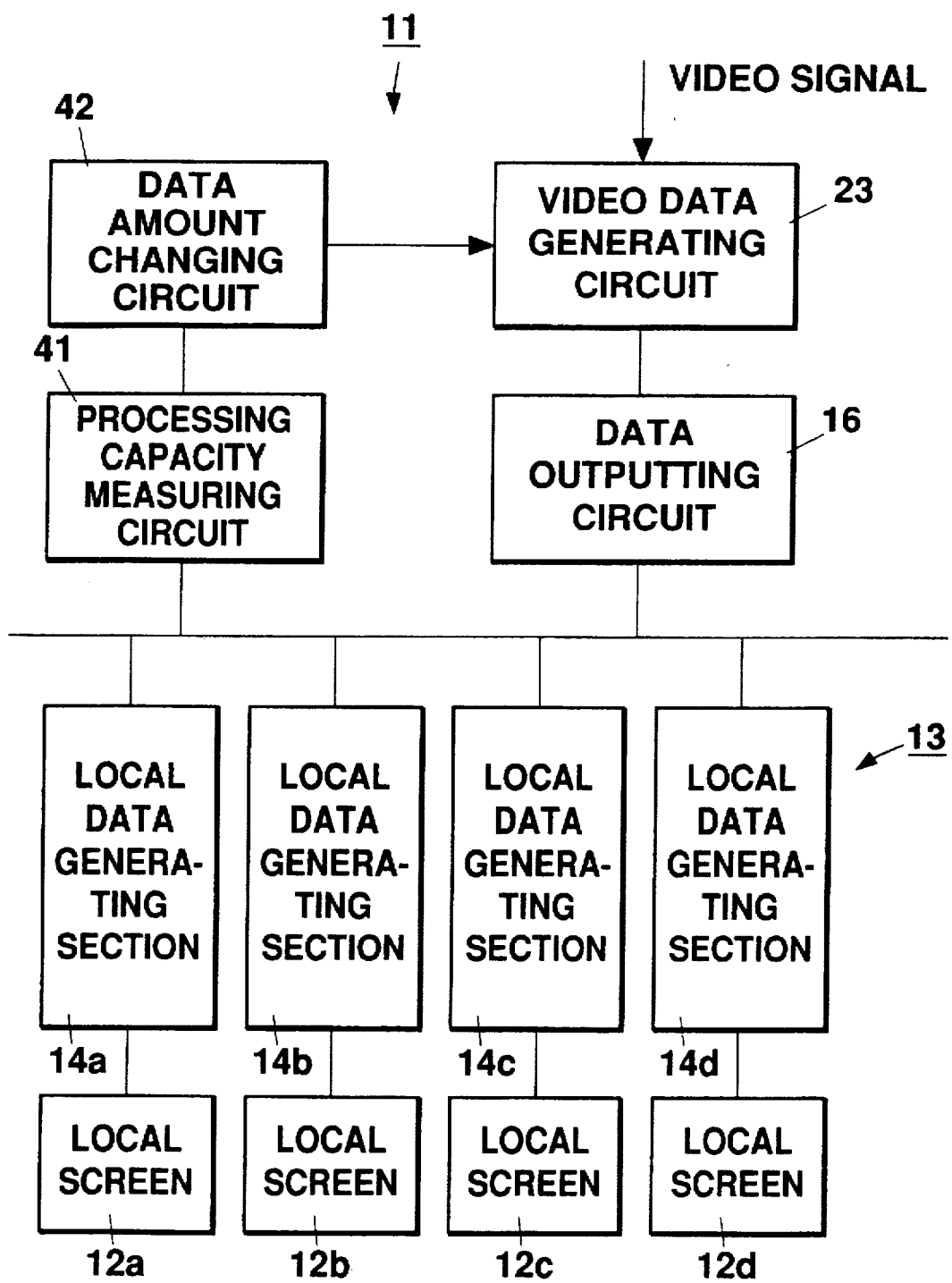
FIG. 11 shows an entire structure of a large screen display apparatus according to a fifth embodiment of the present invention.

FIG. 11 illustrates a structure of a large screen display apparatus according to the fifth embodiment of the present invention. In this fifth embodiment, the screen data generating section 11 comprises a processing capacity measuring circuit 41 for measuring processing capacity of the respective local data generating sections 14a to 14d, and a data amount changing circuit 42 for changing the volume of screen data on the basis of measured processing capacity. The data volume can be determined in accordance with the measured processing capacity of the local data generating sections 14a to 14d so that it is possible to synchronize displaying operations between the respective local screens 12a to 12d. The elements with the identical functions as in the foregoing first to fourth embodiments are identified with the same reference numerals and are explained above in detail.

Assume that an analog video signal is supplied to the video data generating circuit 23 in the screen data generating section 11. The video data generating circuit 23 generates digital video data corresponding to the supplied video signal. The data amount changing circuit 42 determines parameters such as a compression rate, a frame interval, a resolution, and so on for the video data. An extent of the transmission of the video data can be controlled for a unit time by the determined parameters. The output of the processing capacity measuring circuit 41 allows the data amount changing circuit 42 to determine these parameters.

For example, when a video is displayed under the condition of a 640×480 resolution, 24 bits of information for a pixel, and 30 frames for a second, each frame needs 921,600 bytes of video data, resulting in a data volume of 27,648,000 bytes for one second.

The processing capacity measuring circuit 41 first measures data volume for a unit time of the individual local data generating sections 14a to 14d. The processing capacities of the first, second, third, and fourth local data generating sections 14a, 14b, 14c and 14d are 30 million bytes per second, 15 million bytes per second, 30 million bytes per second, and 20 million bytes per second, respectively. One can recognize that the second local data generating section 14b, with the slowest processing speed, cannot complete the process of 27,648,000 bytes per second within the interval between frames. It is accordingly impossible to achieve a desirable video display unless data volume is reduced by changing any parameters such as compression rate, frame rate, or resolution of the video data.

For example, the aforementioned video volume of 27,648,000 bytes per second can be compressed by a compression rate of ½. The data volume is reduced to 13,824,000 bytes per second, which is within the processing capacity of 15 million bytes per second for the second local data generating section 14b. The compression rate of the video data generating circuit 23 set at ½ by the data amount changing circuit 42 allows video display under the condition of a 640×480 resolution, 12 bits of color information per pixel, and 30 frames per second by the processing of the respective local data generating sections 14a to 14d.

In place of the change of compression rate, the horizontal and vertical resolution can be multiplied by $(\frac{1}{2})^{+hu \ \frac{1}{2}}$. The volume of video data is reduced to one half of the original so that the second local data generating section 14b of 15 million bytes per second capacity is capable of completely processing the video data. The data amount changing circuit 42 therefore reduces the resolution of the video data generating circuit 23 to an approximation of 452×339. It is possible to achieve a video display under the condition of a 452×339 resolution and 30 frames per second by processing by the respective local data generating sections 14a to 14d.

Further, instead of changing a compression rate or resolution, a frame rate may be changed by the data amount changing circuit 42. The reduction of the frame rate allows the date volume to be reduced to one half of the original so that a video can be displayed at the frame rate of 15 frames per second.

In the above example, processing speeds of the respective local data generating sections 14a to 14d are discussed as processing capacity. However, when an image is displayed over a plurality of local screens, the difference of processing capacities due to the difference of areas to be processed can be similarly regarded as processing capacity.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A large screen display apparatus, comprising:
   a plurality of displays which together act as a single screen for displaying an object;
   a screen data generating section for generating screen data for forming the object; and
   a plurality of local data generating sections connected to respective displays for converting coordinates of the screen data from the screen data generating section into a local coordinate system corresponding to the respective displays, wherein
   said screen data generating section includes a local data selecting circuit for selecting from the screen data, local screen data for local screens corresponding to the respective displays, and a data outputting circuit for sending selected local screen data in a predetermined order to a corresponding local data generating section, and
   a switching circuit is connected to said data outputting circuit for switching said predetermined order in accordance with content of the object.

2. A large screen display apparatus as defined in claim 1, wherein said local screen data is successively transmitted to the displays in a horizontal sequence.

3. A large screen display apparatus as defined in claim 1, wherein said local screen data is successively transmitted to the displays in a vertical sequence.

4. A large screen display apparatus as defined in claim 1, wherein said local screen data is successively transmitted to the displays in a diagonal sequence.

5. A large screen display apparatus as defined in claim 1, wherein said local screen data is successively transmitted to the displays in a spiral sequence.

6. A large screen display apparatus as defined in claim 1, wherein said screen data generating section further includes a stamping circuit which stamps a time stamp onto the selected local screen data, and said local data generating section includes a stamp determining circuit for determining a time specified by the time stamp, and a screen image generating circuit for causing the respective displays to display at the time specified on the basis of corresponding local screen data.

7. A large screen display apparatus, comprising:
   a plurality of displays which together act as a single screen for displaying an object;

a screen data generating section for generating screen data for forming the object; and a plurality of local data generating sections connected to respective displays for converting coordinates of the screen data from the screen data generating section into a local coordinate system corresponding to the respective displays, wherein said screen data generating section includes a local data selecting circuit for selecting from the screen data, local screen data for local screens corresponding to the respective displays, and a data outputting circuit for sending selected local screen data in a predetermined order to a corresponding local data generating section, and a greater number of said local data generating sections are provided than the number of displays, said local data generating sections being switchably connected to the displays via a switching circuit.

8. A large screen display apparatus, comprising:

a plurality of displays which together act as a single screen for displaying an object;

a screen data generating section for generating screen data for forming the object; and a plurality of local data generating sections connected to respective displays for converting coordinates of the screen data from the screen data generating section into a local coordinate system corresponding to the respective displays, wherein said screen data generating section includes a local data selecting circuit for selecting from the screen data, local screen data for local screens corresponding to the respective displays, and a data outputting circuit for sending selected local screen data in a predetermined order to a corresponding local data generating section, and said screen data generating sections further includes a processing capacity measuring circuit for measuring processing capacity of the local data generating sections, and a data amount changing circuit for changing volume of the screen data on the basis of the processing capacity measured.

9. A large screen display apparatus, comprising:

a plurality of displays which together act as a single screen for displaying an object;

a screen data generating section for generating screen data for forming the object; and a plurality of local data generating sections connected to respective displays for converting coordinates of the screen data from the screen data generating section into a local coordinate system corresponding to the respective displays, wherein said local data generating sections each include a local data selecting circuit for selecting from the screen data, local screen data corresponding to the respective displays, and said screen data generating section outputs the screen data in multicast, and a greater number of said local data generating sections are provided than the number of displays, said local data generating sections being switchably connected to the displays via a switching circuit.

10. A large screen display apparatus as defined in claim 9, wherein said screen data generating section further includes a stamping circuit for stamping a time stamp onto the selected local screen data, and said local data generating section includes a stamp determining circuit for determining a time specified by the time stamp, and a screen image generating circuit for causing the respective displays to display on the basis of corresponding local screen data at the time specified.

11. A large screen display apparatus, comprising:

a plurality of displays which together act as a single screen for displaying an object;

a screen data generating section for generating screen data for forming the object; and a plurality of local data generating sections connected to respective displays for converting coordinates of the screen data from the screen data generating section into a local coordinate system corresponding to the respective displays, wherein said local data generating sections each include a local data selecting circuit for selecting from the screen data, local screen data corresponding to the respective displays, and said screen data generating section outputs the screen data in multicast, and said screen data generating sections further includes a processing capacity measuring circuit for measuring processing capacity of the local data generating sections, and a data amount changing circuit for changing volume of the screen data on the basis of the processing capacity measured.

12. A method for displaying a single large screen object image by combining the displays of a plurality of local display units, said method comprising the steps of:

generating screen data needed to form the large screen object image;

selecting from the generated screen data, local screen data which is particular to respective local display units;

sending selected local screen data in a predetermined order to local data generating units each connected to a corresponding local display unit;

converting coordinates of the local data sent to the local data generating units into local coordinate systems particular to the corresponding local display units; and generating a single display image from the combined displays of the coordinate converted local screen data of the local display units, wherein a greater number of local data generating units are provided than local display units, and the local data processing units are selectively connected to local display units via a switching unit.

13. The method according to claim 12, further comprising the step of:

selecting the predetermined order in which local screen data is sent to the plurality of data processing units in accordance with the content of the object image.

14. The method according to claim 13, wherein the selected predetermined order is a horizontal sequence.

15. The method according to claim 13, wherein the selected predetermined order is a vertical sequence.

16. The method according to claim 13, wherein the selected predetermined order is a diagonal sequence.

17. The method according to claim 13, wherein the selected predetermined order is a spiral sequence.

18. The method according to claim 12, further comprising the step of:

stamping a time stamp onto selected local screen data to allow coordinated display of image data between the local display units.

19. A method for displaying a single large screen object image by combining the displays of a plurality of local display units, said method comprising the steps of:

generating screen data needed to form the large screen object image;

selecting from the generated screen data, local screen data which is particular to respective local display units;

sending selected local screen data in a predetermined order to local data generating units each connected to a corresponding local display unit;

converting coordinates of the local data sent to the local data generating units into local coordinate systems particular to the corresponding local display units;

generating a single display image from the combined displays of the coordinate converted local screen data of the local display units;

measuring processing capacity of the plurality of local data generating units; and changing the volume of screen data based on the measured processing capacity.

* * * * *